A. BRANTEGAN.
REVERSIBLE PULLEY.
APPLICATION FILED JAN. 19, 1920.
1,361,003.
Patented Dec. 7, 1920.
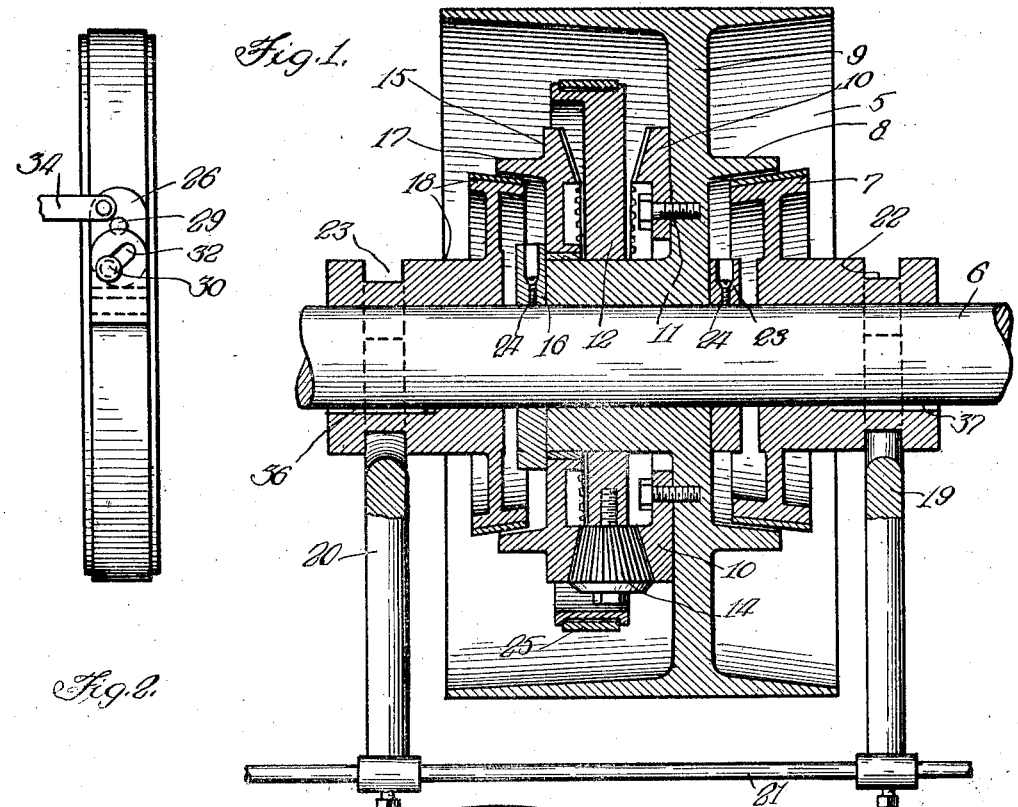
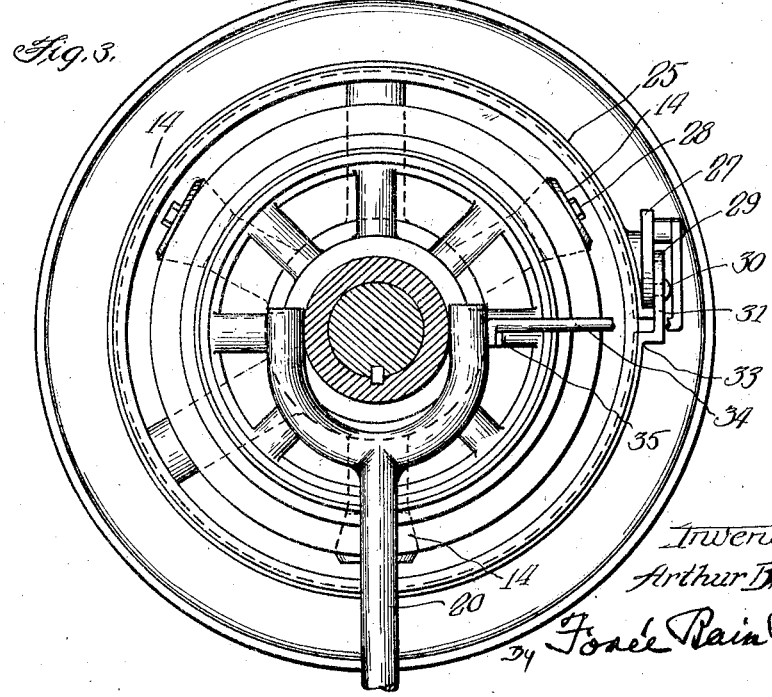

UNITED STATES PATENT OFFICE.

ARTHUR BRANTEGAN, OF CHICAGO, ILLINOIS.

REVERSIBLE PULLEY.

1,361,003.	Specification of Letters Patent.	Patented Dec. 7, 1920.

Application filed January 19, 1920. Serial No. 352,360.

*To all whom it may concern:*

Be it known that I, ARTHUR BRANTEGAN, a citizen of the United States, residing at Chicago, in the county of Cook and State of Illinois, have invented certain new and useful Improvements in Reversible Pulleys, of which the following is a specification.

The invention relates to improvements in reversible pulleys.

One of the objects of the invention is to provide a pulley which may be connected with a shaft, or mounted thereon, which is rotating constantly in a given direction, and having connecting mechanism which will cause the pulley to rotate with the shaft or in contrary direction, according to the manner of connection.

Another object is to provide a reversible pulley having a reversible gear mechanism which will rotate with the pulley when the pulley is driven in a given direction without producing any relative movement of the gear members.

Another object is to place all of the pulley reversing mechanism within the confines of the pulley.

Other, further and more specific objects of the invention will become readily apparent to persons skilled in the art, from a consideration of the following description when taken in conjunction with the drawings, wherein:—

Figure 1 is a central, axial view of the device.

Fig. 2 is a side view of one of the gear members and brake band to hold it fixed to the stationary part when the direction changing gears are driving the pulley.

Fig. 3 is a transverse section taken on line 3—3 of Fig. 1.

In all the views the same reference characters are employed to indicate similar parts.

The driven pulley 5 is loosely rotatable upon the driving shaft 6, but when the clutch member 7 is moved axially toward the pulley, it makes engagement with the clutch member 8 and directly drives the pulley in the same direction that the shaft is rotated.

Secured to the web 9, of the pulley 5, as by bolts or screws 11, is a bevel gear member 10. A disk 12 is rotatable upon the hub 13 of the pulley and carries at proper intervals a plurality of beveled gear pinions 14, normally in mesh with the gear 10. Loose on the hub 13 is a gear member 15, which is also in mesh with the pinions 14, being held in place by a collar 16. The gear member 15 is provided with a clutch member 17 for connection with an axially movable clutch member 18.

A shifting lever 19 moves the clutch member 7 and a shifting lever 20 moves the clutch member 18. It is desirable that these two levers be moved together, so that when the members 17 and 18 are connected together, the members 7 and 8 are disconnected and when the members 7 and 8 are connected together, the members 17 and 18 are disconnected by the same mechanism. The levers 19 and 20 are connected together by a rod 21 to accomplish this result. The shifting levers have parts engaging the circumferential grooves 22 and 23 in the respective clutch members 7 and 18. The pulley hub 13 is confined on the shaft 6 between the collars 16 and 23; the pins 24 holding them from being shifted axially on the shaft.

A brake band 25 surrounds the member or disk 12 and is held in contact therewith by a tightening mechanism shown more clearly in Fig. 2 consisting of the member 26 pivoted to a casting 27 that is secured to one end of the brake band 25, as at 28, the pivot 29 being the point upon which the part 27 rotates. The part 26 is provided with a stud 30 which projects into an inclined slot 32 in the fitting 31, which is connected to the other end of the brake band, as at 33. Now when the fitting 26 is rotated, as by the arm 34, it draws the two ends of the brake band together which tightens on the disk 12, and holds it in stationary position. The inner end of the arm 34 is connected to the shifting lever 20, as at 35, so that when the arm 20 is moved inwardly, for the purpose of closing the clutch, between the members 17 and 18, the arm 34 is moved co-incidently and therefore the band tightening mechanism is operated at the same time.

The operation of the device, under the circumstances related, will be as follows:—The clutch members 7 and 8 being disconnected and the shaft, being connected to clutch member 18 by the key 36 will rotate the gear member 15 which will in turn rotate the pinion 14 and drive the pulley 5 in the opposite direction to the gear member 10, in a manner clearly understood, from a consideration of the structure shown. When the pulley is driven through the train of gears, just described, the direction of rotation will be opposite to that at which it is driven directly by the shaft. Now that the pulley 5 may be driven in the opposite direction, the same direction of the shaft, it is only necessary to move the levers 19 and 20 to the left which will disconnect the clutch members 17 and 18 and connect the clutch members 7 and 8, the key 37 being the means of connecting the clutch member 7 with the shaft, will cause the pulley to be directly driven at the same speed as the shaft in the same direction that the shaft is rotating and will cause the gear members to be bodily rotated without any relative movement between the members.

Any means for tightening the brake band and to hold it stationary, other than that shown may be employed for the purpose. And, furthermore, any sort of clutch other than shown may be used for the purpose of alternately connecting the clutch members together.

Although in the foregoing description of the structure shown in the drawing it has been assumed that the shaft drives the pulley in one or the other direction, it is obvious that the power may be applied to the pulley to drive the shaft in one or the other direction.

While I have herein shown a single embodiment of my invention for the purpose of clear disclosure, it will be manifest to persons skilled in the art that, considerable changes may be made in the general arrangement and disposition of the parts within the scope of the appended claims.

Having described my invention what I claim as new and desire to secure by Letters Patent is:—

1. A reversible pulley comprising a shaft upon which it is normally rotatable; a clutch on the said shaft to drive the pulley in like direction; another clutch on said shaft; a train of gears for connecting the pulley to the shaft, through the latter clutch, including a rotatable element; means to hold and alternately release said element, and means for alternately opening one clutch and closing the other to change the direction of rotation of said pulley.

2. In a reversible pulley the combination of a shaft upon which it is normally rotatable; a clutch on said shaft to drive the pulley in like direction; another clutch on the shaft; a train of gears for connecting the pulley to the shaft through the latter clutch, including a rotatable element to be held when the gear drives the pulley and means to shift the clutch members and release said rotatable element.

3. A reversible pulley having in combination a shaft upon which it is normally rotatable; a clutch on said shaft to drive the pulley in one direction; another clutch on said shaft; a train of gears for connecting the pulley to the shaft through the latter clutch to drive the pulley in opposite direction, including a rotatable element to be held when the gear drives the pulley; a brake band to hold the rotatable element and means to close one clutch and open the other and to tighten and loosen the brake band, respectively.

4. A reversible pulley having a shaft upon which it is normally freely rotatable, a clutch coöperating with said shaft and said pulley to drive the shaft in the same direction as the pulley, a second clutch, a train of gears including a rotatable element controlled by said second clutch for interconnecting said pulley and shaft to drive the shaft in the reverse direction from the pulley, means to hold said rotatable element while the shaft is so driven, and means for alternately opening one clutch and closing the other to change the direction of relative rotation between pulley and shaft.

In testimony whereof I hereunto subscribe my name.

ARTHUR BRANTEGAN.